US012173656B1

(12) United States Patent
Tripathi et al.

(10) Patent No.: US 12,173,656 B1
(45) Date of Patent: Dec. 24, 2024

(54) TURBINE ENGINE INCLUDING AN AIR TURBINE STARTER AND A BLEED AIR CIRCUIT

(71) Applicant: Unison Industries, LLC, Jacksonville, FL (US)

(72) Inventors: Pallavi Tripathi, Bengaluru (IN); Sheo Narain Giri, Bengaluru (IN); Shiloh Montegomery Meyers, Miamisburg, OH (US); Brian Christopher Kemp, Troy, OH (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 18/495,001

(22) Filed: Oct. 26, 2023

(51) Int. Cl.
*F02C 7/27* (2006.01)
*F02C 7/32* (2006.01)
*F02C 7/36* (2006.01)

(52) U.S. Cl.
CPC .................. *F02C 7/27* (2013.01); *F02C 7/32* (2013.01); *F02C 7/36* (2013.01)

(58) Field of Classification Search
CPC ...... F02C 7/27; F02C 7/32; F02C 7/36; F02C 9/18
See application file for complete search history.

(56) References Cited

U.S. PATENT DOCUMENTS

| 5,136,837 A | 8/1992 | Davison |
|---|---|---|
| 6,257,003 B1 | 7/2001 | Hipsky |
| 6,305,156 B1 | 10/2001 | Lui |
| 6,782,701 B2 | 8/2004 | Liu et al. |
| 7,624,592 B2 | 12/2009 | Lui et al. |
| 9,650,967 B2 | 5/2017 | Defrancesco |
| 10,054,051 B2 | 8/2018 | Foutch et al. |
| 10,100,744 B2 | 10/2018 | Mackin et al. |
| 10,550,770 B2 | 2/2020 | Foutch et al. |
| 10,794,295 B2 | 10/2020 | Schwarz |
| 10,814,988 B2 | 10/2020 | Bruno et al. |
| 11,421,604 B2 | 8/2022 | Woods |
| 2009/0288421 A1* | 11/2009 | Zeiner ....................... F02C 9/18 60/788 |
| 2010/0107594 A1 | 5/2010 | Coffinberry et al. |
| 2010/0126182 A1* | 5/2010 | Hoover ..................... F02K 3/06 60/785 |
| 2012/0045317 A1* | 2/2012 | Saladino ................... F02C 6/08 415/145 |
| 2017/0241340 A1 | 8/2017 | Feulner |
| 2018/0009536 A1 | 1/2018 | Christopherson et al. |
| 2019/0383220 A1* | 12/2019 | Mackin .................. F02C 7/277 |
| 2023/0228214 A1 | 7/2023 | Miller et al. |

FOREIGN PATENT DOCUMENTS

WO 2012163667 A1 12/2012

* cited by examiner

*Primary Examiner* — Steven M Sutherland
(74) *Attorney, Agent, or Firm* — McGarry Bair PC

(57) ABSTRACT

A turbine engine including an engine core, an engine drive shaft, an accessory gear box (AGB), an air turbine starter (ATS) and a bleed air circuit. The engine core has a fan section, a compressor section, a combustion section, and a turbine section in serial flow arrangement. The engine drive shaft operably couples the fan section, the compressor section and the turbine section. The AGB and the ATS are operably coupled to the engine drive shaft.

20 Claims, 2 Drawing Sheets

TURBINE ENGINE INCLUDING AN AIR TURBINE STARTER AND A BLEED AIR CIRCUIT

TECHNICAL FIELD

The disclosure generally relates to a turbine engine including an air turbine starter, and more specifically to a bleed air circuit from the turbine engine.

BACKGROUND

A turbine engine, for example a gas turbine engine, utilizes an air turbine starter (ATS) during startup of the turbine engine. The ATS is often mounted near the turbine engine and the ATS can be coupled to a high-pressure fluid source, such as compressed air, which impinges upon a turbine rotor in the ATS causing it to rotate at a relatively high rate of speed. The ATS includes an output drive shaft that is driven by the turbine rotor, typically through a reducing gear box, where the output drive shaft provides rotational energy to a rotatable element of the turbine engine (e.g., the crankshaft or the rotatable shaft) to begin rotating. The rotation by the ATS continues until the turbine engine attains a self-sustaining operating rotational speed.

BRIEF DESCRIPTION OF THE DRAWINGS

A full and enabling disclosure of the present subject matter, including the best mode thereof, directed to one of ordinary skill in the art, is set forth in the specification, which makes reference to the appended FIGS., in which.

DETAILED DESCRIPTION

Figure 1:
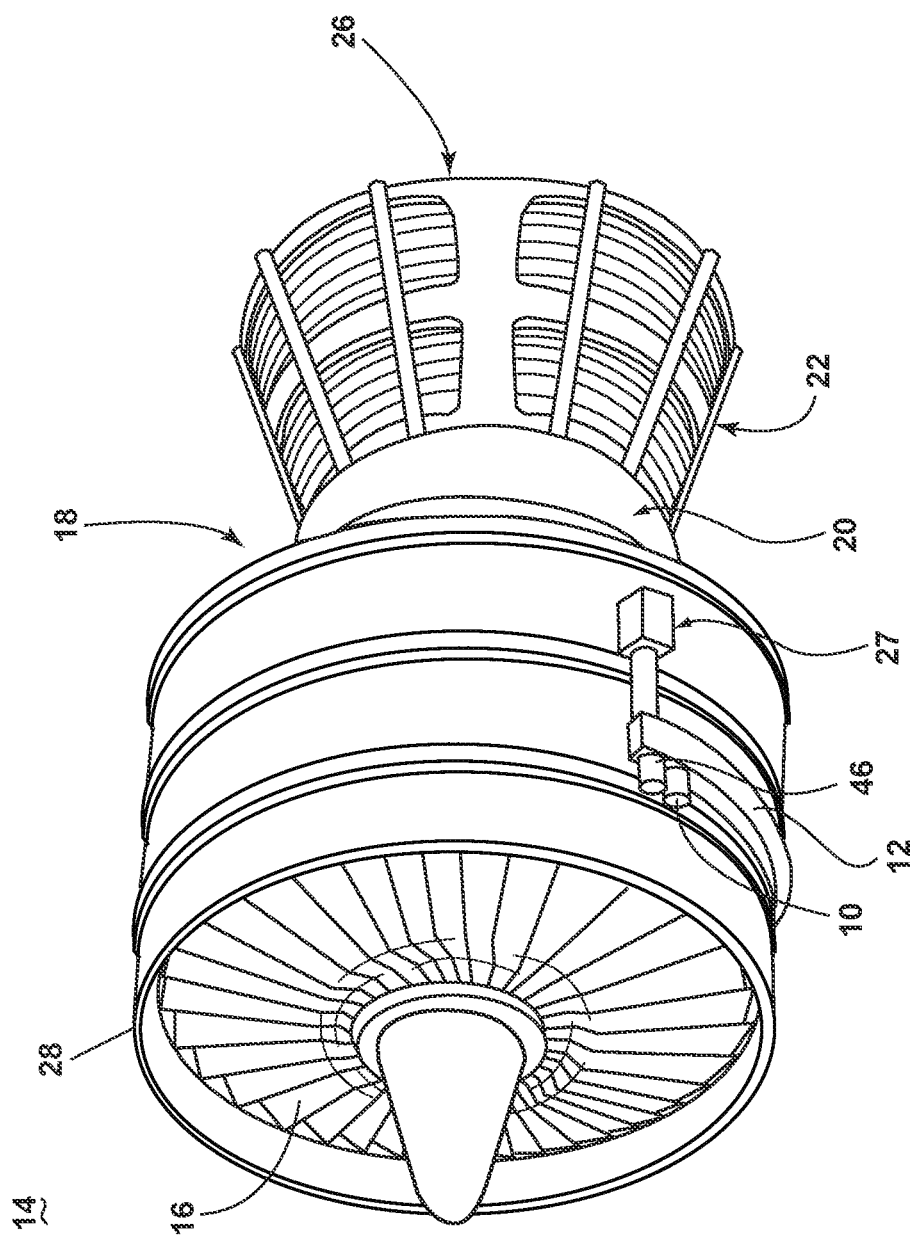
FIG. 1 is a schematic illustration of a turbine engine having an air turbine starter, in accordance with various aspects described herein.

Aspects of the present disclosure are directed to a turbine engine including an ATS, a bleed air turbo (BAT) and a bleed air circuit drawing bleed air from the turbine engine. The turbine engine includes an engine drive shaft. The BAT and the ATS are each independently coupled to an accessory gearbox (AGB). The AGB is selectively coupled to the engines drive shaft. Driving of the ATS and the BAT can each drive the engine drive shaft through driving of the AGB.

The bleed air circuit is used to feed bleed air from the turbine engine to at least the BAT. Driving of the BAT, through the bleed air, drives the AGB, which drives the engine drive shaft. A portion of the bleed air within the bleed air circuit can be fed to a system external to the turbine engine. The bleed air circuit including the BAT can be used to extract a work from the bleed air in order to augment the driving of the engine drive shaft. For purposes of illustration, the present disclosure will be described with respect to a turbine engine. It will be understood, however, that aspects of the disclosure described herein are not so limited and can have general applicability for other engines or other turbine engines. For example, the disclosure can have applicability for an engine starter assembly used with any suitable engine or within any suitable vehicle, and can be used to provide benefits in industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms such as "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction extending towards or away from a common center. For example, in the overall context of a turbine engine, radial refers to a direction along a ray extending between a center longitudinal axis of the turbine engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, fastened, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, a "controller" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The exemplary drawings are for purposes of illustration only and the dimensions, positions, order and relative sizes reflected in the drawings attached hereto can vary.

FIG. 1 is a schematic perspective view of a turbine engine 14. The turbine engine 14 can include an air turbine starter (ATS) 10 and a bleed air turbo (BAT) 46. The ATS 10 is coupled to an accessory gear box (AGB) 12, also known as a transmission housing. The BAT 46 is coupled to the AGB 12. The AGB 12 includes a housing (not illustrated) with at least a plurality of gears (not illustrated) provided within the housing.

The turbine engine 14 can include in a serial flow arrangement a fan section 16, a compressor section 18, a combustion section 20, a turbine section 22, and an exhaust section 26. The fan section 16 can be at least partially encased by a fan casing 28 or otherwise by a nacelle or casing of the turbine engine 14. The turbine engine 14 can include other components not illustrated.

The AGB 12, the ATS 10, and the BAT 46 are schematically illustrated as being mounted to a respective portion of the turbine engine 14. At least a portion of the ATS 10, the BAT 46 or the AGB 12 can be located radially outside of a fan casing 28. That is, the ATS 10, the BAT 46, the AGB 12, or a combination thereof can be located radially outside of the fan section 16. Alternatively, it is contemplated that in a differing and non-limiting example, at least a portion of the ATS 10, the BAT 46, the AGB 12, or a combination thereof can be located within any suitable portion of the turbine engine 14 such as near the compressor section 18, where the ATS 10, the BAT 46 or the AGB 12 can be coupled to a transfer gear box (not shown).

The AGB 12 can be coupled to the turbine engine 14 at a portion of the turbine section 22 by way of a mechanical power take-off 27. The mechanical power take-off 27 contains multiple gears and means for mechanical coupling of the AGB 12 to the turbine engine 14.

Figure 2:
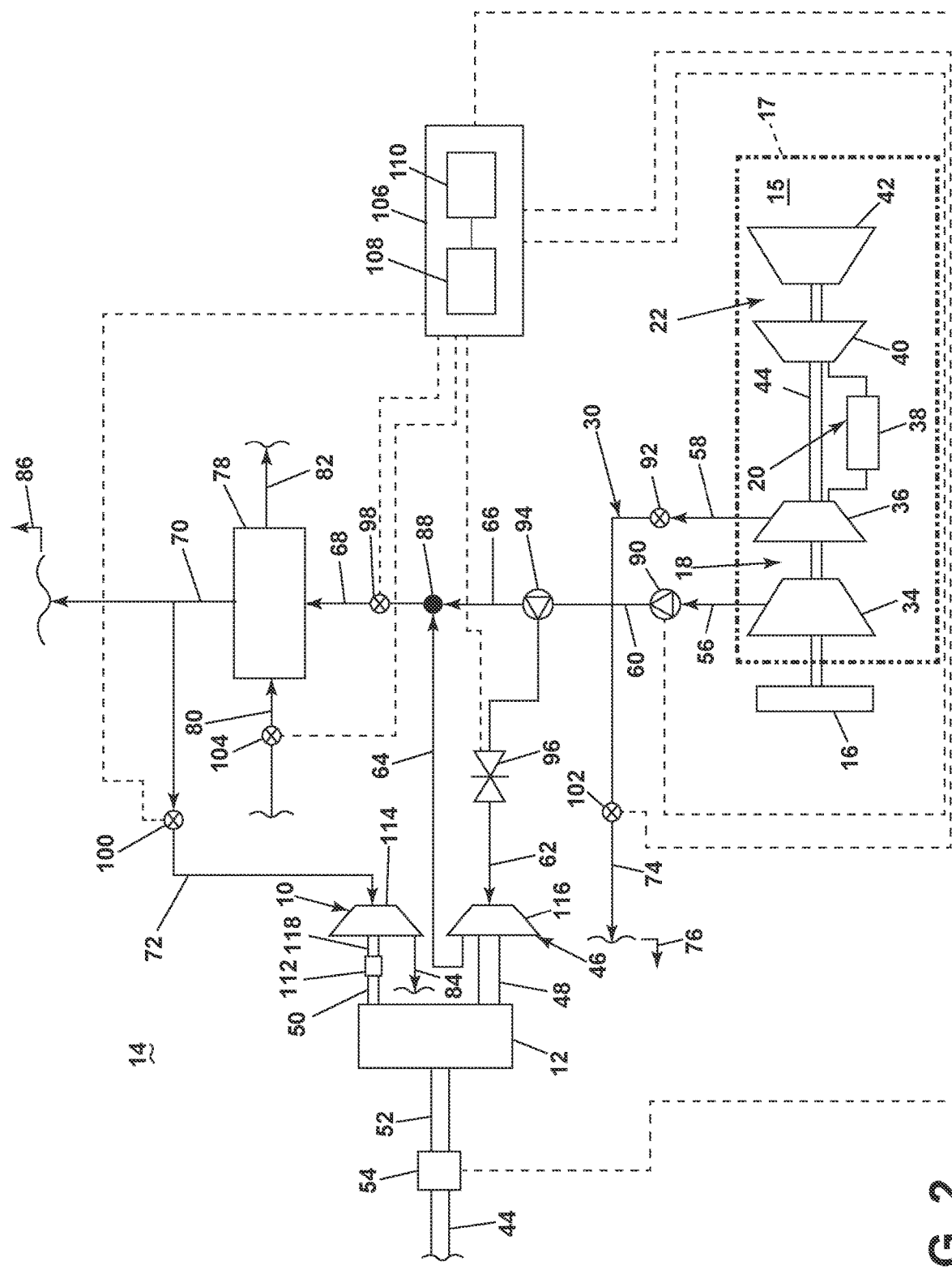
FIG. 2 is a schematic block diagram of a bleed air circuit suitable for use within the turbine engine of FIG. 1, the bleed air circuit feeding a bleed air from the turbine engine to a bleed air turbo of the turbine engine.

FIG. 2 is a schematic block diagram of a bleed air circuit 30 interconnecting the turbine engine 14 and the ATS 10 of FIG. 1.

The fan section 16, the compressor section 18, the combustion section 20 and the turbine section 22 collectively define an engine core 15. At least a portion of the engine core 15 can be provided within an engine casing 17 that is coupled to the fan casing 28 (FIG. 1) or nacelle. Any suitable portion of the turbine engine 14 can be provided within the engine casing 17.

The compressor section 18 can include a low pressure (LP) compressor 34 and a high pressure (HP) compressor 36 in serial flow arrangement. The turbine section 22 can include a high pressure (HP) turbine 40 and a low pressure (LP) turbine 42 in serial flow arrangement. The combustion section 20 can include a combustor 38 provided between and fluidly coupling the HP compressor 36 to the HP turbine 40. An engine drive shaft 44 drivingly couples the turbine section 22 to the compressor section 18 and the fan section 16. While not illustrated, the engine drive shaft 44 can include a high pressure (HP) shaft drivingly coupling the HP turbine 40 to the HP compressor 36 to collectively define an HP spool, and a low pressure (LP) shaft drivingly coupling the LP turbine 42 to the LP compressor 34 and the fan section 16 to collectively define an LP spool.

The BAT 46 includes a BAT output shaft 48 and a BAT turbine 116 drivingly coupled to the BAT output shaft 48. The BAT output shaft 48 is drivingly coupled to the AGB 12.

The ATS 10 includes an ATS output shaft 50, an ATS gearbox 112, an ATS drive shaft 118, and an ATS turbine 114. The ATS turbine 114 is drivingly coupled to the ATS gearbox 112 through the ATS drive shaft 118 to define a mechanical input to the ATS gearbox 112. The ATS gearbox 112 is coupled to the ATS output shaft 50 to define a mechanical output of the ATS gearbox 112 and the ATS 10 as a whole. The ATS turbine 114, the ATS gearbox 112, the ATS drive shaft 118, and at least a portion of the ATS output shaft 50 can be received within an ATS housing (not illustrated). Both of the BAT output shaft 48 and the ATS output shaft 50 define a mechanical input to the AGB 12.

The BAT 46 can be similar to the ATS 10 in that both the ATS 10 and the BAT include a respective turbine (e.g., the ATS turbine 114 and the BAT turbine 116, respectively) and a receptive output drive shaft (e.g., the ATS output shaft 50 and the BAT output shaft 48, respectively). However, the BAT 46 can be formed without a respective gearbox and can be coupled to the AGB 12 through the BAT output shaft 48, while the ATS 10 includes the ATS gearbox 112 and can include the ATS output shaft 50 that can be selectively couplable to the AGB 12 through a clutch or a decoupler. Alternatively, the BAT 46 can include a gearbox. As the BAT output shaft 48 is coupled to the AGB 12, any rotation of the BAT turbine 116 (e.g., through supplying bleed air to the BAT 46) will cause a transfer of energy from the BAT 46 to the AGB 12 through the BAT output shaft 48. As the ATS 10 includes a decoupler or a clutch, rotation of the ATS turbine 114 does not mean that energy will be transferred to the AGB 12 from the ATS 10 through the ATS output shaft 50 unless the clutch or decoupler of the ATS 10 is intentionally engaged.

The AGB 12 is operably coupled to the engine drive shaft 44. As illustrated, the AGB 12 is indirectly operably coupled to the engine drive shaft 44. The AGB 12 includes an AGB drive shaft 52 defining a mechanical output of the AGB 12. The AGB drive shaft 52 is selectively operably coupled to the engine drive shaft 44. As a non-limiting example, a decoupler 54 can selectively operably couple the AGB drive shaft 52 and the engine drive shaft 44. Alternatively, the AGB drive shaft 52 can be directly coupled to or integrally formed with the engine drive shaft 44. The AGB 12 is operably coupled to any suitable portion of the engine drive shaft 44.

The turbine engine 14 includes a Pre-Cooler heat Exchanger (PCE) 78 configured to direct a bleed air from the turbine engine 14 to an external system 86 that is provided external the turbine engine 14. The PCE 78 is fluidly coupled to the external system 86 through a bleed air outlet line 70. The external system 86 can include any suitable system that utilizes a bleed air from the turbine engine 14 during operation of the external system 86 such as, but not limited to, an Environmental Control System (ECS). The PCE 78 is further fluidly coupled to a source of cooling fluid through a cooling fluid input 80. The source of cooling fluid can be a portion of the turbine engine 14 such as the fan section 16 or the compressor section 18. The PCE 78 can exhaust a cooling fluid received from the source of cooling fluid through a cooling fluid output 82. The cooling fluid output 82 can be fluidly coupled to atmosphere or to a portion of the turbine engine 14 such as the turbine section 22, the exhaust section 26 (FIG. 1) of the turbine engine 14, or a combination thereof.

The bleed air circuit 30 is fluidly coupled to the turbine engine 14 and is configured to draw bleed air from at least one portion of the turbine engine 14. The bleed air circuit 30 can include two bleed air passages directly fluidly coupled to a respective portion of the turbine engine. It will be appreciated that the passages of the bleed air circuit 30 can be formed as discrete elements (e.g., conduits) or otherwise be integrally formed within an existing structure of, for example, the turbine engine 14. As a non-limiting example, the bleed air circuit 30 can include an LP bleed air passage 56 and an HP bleed air passage 58. The HP bleed air passage 58 can be coupled to a portion of the turbine engine 14 with a higher-pressure working airflow with respect to where the LP bleed air passage 56 is provided. In other words, the HP bleed air passage 58 includes bleed air having a higher pressure than bleed air of the LP bleed air passage 56. As a non-limiting example, the LP bleed air passage 56 can be directly fluidly coupled to the LP compressor 34 and the HP bleed air passage 58 can be directly fluidly coupled to the HP compressor 36.

The bleed air circuit 30 comprises a first bleed air passage 60, a second bleed air passage 62 and a third bleed air passage 64. The first bleed air passage 60 is fluidly coupled to the turbine engine 14 through the LP bleed air passage 56 and the HP bleed air passage 58. The second bleed air passage 62 fluidly couples the first bleed air passage 60 to the BAT 46 and defines a fluid input to the BAT 46. The third bleed air passage 64 fluidly couples the BAT 46 to a bleed air inlet 68 leading directly to the PCE 78.

The bleed air circuit 30 includes a bypass passage 66 fluidly coupling the first bleed air passage 60 to the third bleed air passage 64 while bypassing the BAT 46 or the second bleed air passage 62. The bypass passage 66 and the third bleed air passage 64 meet at a junction 88. The junction 88 can be provided upstream of the PCE 78. Alternatively, the bypass passage 66 and the third bleed air passage 64 can be individually, separately coupled to the PCE 78 such that the bypass passage 66 bypasses the BAT 46, and the bypass passage 66 and the third bleed air passage 64, together, define the bleed air inlet line 68 leading to the PCE 78. With the bypass passage 66 and the third bleed air passage 64 being independently coupled to the PCE 78, the PCE 78 defines the junction 88. As the PCE 78 outputs to the external system 86, via the bleed air outlet line 70, the third bleed air passage 64 can be said to fluidly couple to the BAT 46 to the external system 86 and the bypass passage 66 can be said to fluidly couple the first bleed air passage 60 to the external system 86.

The bleed air circuit 30 includes a fourth bleed air passage 72 defining a fluid input to the ATS 10. The fourth bleed air passage 72 can be fluidly coupled to any suitable portion of the bleed air circuit 30. As a non-limiting example, the fourth bleed air passage 72 can be fluidly coupled to the bleed air outlet line 70. The ATS 10 can exhaust the fluid received from the fourth bleed air passage 72 through an exhaust line 84. The exhaust line 84 can be fluidly coupled to atmosphere or to a portion of the turbine engine 14 such as the fan section 16, the compressor section 18, the turbine section 22, an exhaust section 26 of the turbine engine 14, or a combination thereof.

The bleed air circuit 30 can include an auxiliary bleed air passage 74 that is fluidly coupled to an auxiliary system 76 of the turbine engine 14. The auxiliary system 76 is defined as any suitable system of the turbine engine 14 that can utilize bleed air from at least one of the HP bleed air passage 58 or the LP bleed air passage 56. As a non-limiting example, the auxiliary system 76 can include an oil cooling system, a wing anti-ice system, a blade anti-ice system, a nacelle anti-ice system, or a combination thereof.

At least a portion of the bleed air circuit 30, the ATS 10, the AGB 12 and the BAT 46 are provided exterior the engine casing 17. As a non-limiting example, all of the bleed air circuit 30 (besides the LP bleed air passage 56 and the HP bleed air passage 58), the ATS 10, the AGB 12 and the BAT 46 are provided exterior the engine casing 17.

The bleed air circuit 30 is selectively fluidly coupled to the LP bleed air passage 56 and the HP bleed air passage 58 through a first valve 90 and a second valve 92, respectively. The first valve 90 and the second valve 92 can include any suitable valve. As a non-limiting example, the first valve 90 can include a check valve such that bleed air is fed through the LP bleed air passage 56 during operation of the turbine engine 14. As a non-limiting example, the first valve 90 can include an on-off valve such that bleed air is selectively fed through the LP bleed air passage 56 during operation of the turbine engine 14. As a non-limiting example, the second valve 92 can include an on-off or stop valve that selectively opens and closes to supply or stop, respectively, bleed air from the HP bleed air passage 58 from flowing into the bleed air circuit 30. As a non-limiting example, the second valve 92 can include a check valve such that bleed air is fed through the HP bleed air passage 58 during operation of the turbine engine 14.

The bleed air circuit 30 comprises a third valve 94 provided along the first bleed air passage 60. The third valve 94 can include any suitable valve. As a non-limiting example, the third valve 94 can include a check valve provided along a junction between the first bleed air passage 60 and the second bleed air passage 62 that prevents backflow from the second bleed air passage 62 or the bypass passage 66 into the first bleed air passage 60. As a non-limiting example, the third valve 94 can include a split valve that diverts all fluid under a certain volumetric flow rate to the second bleed air passage 62 and all fluid over the certain volumetric flow rate to the bypass passage 66. The split valve can be used in an instance where the BAT 46 has a certain maximum volumetric flow rate that it can accept. The split valve, in this instance, can be sized to ensure that the volumetric flow rate of the fluid within the second bleed air passage 62 and being fed to the BAT 46 does not exceed the maximum volumetric flow rate of the BAT 46. The third valve 94 can be provided at a junction between the first bleed air passage 60, the second bleed air passage 62 and the bypass passage 66.

The bleed air circuit 30 comprises a fourth valve 96 provided along the second bleed air passage 62. The fourth valve 96 fluidly couples the first bleed air passage 60 to the BAT 46. The fourth valve 96 can include any suitable valve. As a non-limiting example, the fourth valve 96 can include a needle valve used to control the volumetric flow rate of the fluid within the second bleed air passage 62 being fed to the BAT 46.

The bleed air circuit 30 can include a fifth valve 98 provided along the bleed air inlet line 68. The fifth valve 98 fluidly couples the bleed air inlet line 68 to the PCE 78 or otherwise to the external system 86. The fifth valve 98 can include any suitable valve. As a non-limiting example, the fifth valve 98 can include an on-off or stop valve.

The bleed air circuit 30 can include a sixth valve 100 provided along the fourth bleed air passage 72. The sixth valve 100 fluidly couples the bleed air outlet line 70 to the ATS 10. The sixth valve 100 can include any suitable valve. As a non-limiting example, the sixth valve 100 can include an on-off or stop valve.

The bleed air circuit 30 can include a seventh valve 102 provided along the auxiliary bleed air passage 74. The seventh valve 102 fluidly couples the first bleed air passage 60 to the auxiliary bleed air passage 74. The seventh valve 102 can include any suitable valve. As a non-limiting example, the seventh valve 102 can include an on-off or stop valve.

It will be appreciated that the valves of the bleed air circuit 30 can be changed, moved, or removed based on the need of the bleed air circuit 30. The turbine engine 14 can include any other suitable valves such as, but not limited to, an eighth valve 104 provided along the cooling fluid input 80. The eighth valve 104 can fluidly couple the cooling fluid within the cooling fluid input 80 to the PCE 78. As a non-limiting example, the bleed air circuit 30 can include any suitable component along a respective passage of the bleed air circuit 30 that is configured to create a pressure drop along the respective passage. As a non-limiting example, the bypass passage 66 can include an orifice plate to ensure that the fluid within the bypass passage 66 is at a desired pressure prior to being fed to the PCE 78, external system 86, the junction 88 or a combination thereof. The component configured to create a pressure drop along the respective passage can be any suitable component such as, but not limited to, an orifice plate, a valve, an ejector, an orifice, or a combination thereof.

It will be appreciated that components of the bleed air circuit 30 or the turbine engine 14 can be moved, replaced, or removed with respect to the illustrated configuration. For example, the PCE 78 can be excluded from the turbine engine 14 or otherwise moved to a differing location along the bleed air circuit 30. As a non-limiting example, the fourth bleed air passage 72 can be provided upstream of the PCE 78. As a non-limiting example, the bleed air circuit 30 can include additional or differing placements of the bleed air passages configured to draw bleed air from the turbine engine 14 including, but not limited to, the fan section 16, the compressor section 18, the turbine section 22 the exhaust section 26, or a combination thereof.

A controller 106 (e.g., an electronic controller) can be used to selectively, operably control certain portions of turbine engine 14. As a non-limiting example, the controller 106 can be used to selectively, operably control the first valve 90, the second valve 92, the third valve 94, the fourth valve 96, the fifth valve 98, the sixth valve 100, the seventh valve 102, the eighth valve 104, the decoupler 54, any other valve, or any combination thereof. The controller 106 can include a processor 108 and a memory 110, and can be communicatively coupled to respective portions of the bleed air circuit 30 or turbine engine 14. The memory 110 can be defined as an internal storage for instructions and code for controlling or monitoring various aspects of the bleed air circuit 30 or turbine engine 14. For example, the memory 110 can store code, executable instructions, commands, instructions, authorization keys, specialized data keys, passwords, or the like. The memory 110 can be RAM, ROM, flash memory, or one or more different types of portable electronic memory, such as discs, DVDs, CD-ROMs, etc., or any suitable combination of these types of memory. The processor 108 can be defined as a portion of the controller 106 which can receive an input, perform calculations, and output executable data. The processor 108 can include a microprocessor. While described in terms of the controller 106, it will be appreciated that the controller 106 can be a control system including multiple separate controllers coupled to respective portions of the turbine engine 14. The control system can collectively define a system used to automatically control operation of the turbine engine 14 and the bleed air circuit 30.

During operation of the turbine engine 14, a freestream airflow flows against a forward portion of the turbine engine 14. A portion of the freestream airflow enters the fan section 16 to define an inlet airflow. A portion of the inlet airflow enters the engine core 15 defining a working airflow, which is used for combustion within the engine core 15.

More specifically, the working airflow flows into the LP compressor 34, which then pressurizes the working airflow thus defining a pressurized airflow that is supplied to the HP compressor 36, which further pressurizes the air. The working airflow, or the pressurized airflow, from the HP compressor 36 is mixed with fuel in the combustor 38 and ignited, thereby generating combustion gases. Some work is extracted from these gases by the HP turbine 40, which drives the HP compressor 36 through the engine drive shaft 44. The combustion gases are discharged into the LP turbine 42, which extracts additional work to drive the LP compressor 34, and the working airflow, or exhaust gas, is ultimately discharged from the turbine engine 14 via an exhaust section 26. The driving of the LP turbine 42 drives the engine drive shaft 44 to rotate the fan section 16 and the LP compressor 34.

It is contemplated that a portion of the working airflow is drawn as bleed air (e.g., from the compressor section 18). The bleed air provides an airflow to engine components requiring cooling. The temperature of the working airflow exiting the combustion section 20 is significantly increased with respect to the working airflow within the compressor section 18. As such, cooling provided by the bleed air is necessary for operating of such engine components in heightened temperature environments or a hot portion of the unducted turbine engine 14.

During operation, bleed air from the cold portions (e.g., the compressor section 18 or the fan section 16) can be selectively drawn into the bleed air circuit 30 through, for example, the LP bleed air passage 56 and the HP bleed air passage 58. As the bleed air circuit 30 can include at least two bleed air passages (e.g., the LP bleed air passage 56 and the HP bleed air passage 58), bleed air from at least one location within the turbine engine 14 can be supplied to the bleed air circuit 30. As a non-limiting example, bleed air from only the LP compressor 34, only the HP compressor 36, or a combination thereof can be supplied to the bleed air circuit 30. The fluid provided to the bleed air circuit 30 through at least one of the LP bleed air passage 56, the HP bleed air passage 58, or any other bleed air passage directly fluidly coupled to the turbine engine 14 will hereinafter be referred to as the circuit bleed air.

The circuit bleed air from at least one of the LP bleed air passage 56, the HP bleed air passage 58, or any other bleed air passage directly fluidly coupled to the turbine engine 14 is then fed to the first bleed air passage 60, The circuit bleed air in the first bleed air passage 60 can then be fed to at least one of any of the second bleed air passage 62, the bypass passage 66 or the auxiliary bleed air passage 74 depending on the operation of the third valve 94, fourth valve 96 and seventh valve 102. As a non-limiting example, if it is determined that operation of the auxiliary system 76 is desired for operation of the turbine engine 14 or for another reason (e.g., wing anti-icing of an aircraft that the turbine engine is coupled to), the seventh valve 102 can be selectively opened, via the controller 106, such that at least a portion of the circuit bleed air is fed to the auxiliary system 76.

The circuit bleed air can be selectively fed to the BAT 46 through the second bleed air passage 62. The circuit bleed air fed to the BAT 46 drives the BAT turbine, which thereby drives the BAT output shaft 48. The BAT output shaft 48 can be coupled to or selectively coupled to (e.g., through a clutch, not illustrated) the AGB 12 such that the BAT output shaft 48 can drive the AGB 12. The driving of the AGB 12 drives the AGB drive shaft 52, which can ultimately drive the engine drive shaft 44. As such, it will be appreciated that supplying of the circuit bleed air to the BAT 46 can be used to drive the engine drive shaft 44. The circuit bleed air can be fed to the ATS 10 through the fourth bleed air passage 72 to drive the ATS turbine 114, which drives the ATS output shaft 50. The ATS output shaft 50 is coupled to or selectively coupled to (e.g . . . , through a clutch, not illustrated) the AGB 12. The driving of the AGB 12 drives the AGB drive shaft 52, which can drive the engine drive shaft 44.

The driving of the engine drive shaft 44, through supplying the circuit bleed air to the BAT 46 can be used to augment at least one of a rotational velocity or torque of the engine drive shaft 44. In other words, the engine drive shaft 44 can be driven, by the turbine section 22, during normal operation of the turbine engine 14. The BAT 46 can be used to recoup energy from the bleed air in order to augment the driving of the engine drive shaft 44 such that the engine drive shaft 44 is driven, in part, by the turbine section 22 and the BAT 46 during operation of the turbine engine 14. It is contemplated that the circuit bleed air can be fed to or selectively fed to the BAT 46 to augment the driving of the engine drive shaft 44. As a non-limiting example, if at least one of a sensed torque or rotational velocity of the engine drive shaft 44 is lower than a needed torque or rotational velocity of the engine drive shaft 44, the circuit bleed air can be selectively fed to the BAT 46 to ultimately increase at least one of the torque or the rotational velocity of the engine drive shaft 44, such as up to the needed torque or rotational velocity. It is contemplated that the BAT 46 can further be used as a brake to the engine drive shaft 44. As a non-limiting example, the BAT 46 can rotate the BAT output shaft 48 or otherwise cause the AGB drive shaft 52 to rotate counter the rotation of the engine drive shaft 44. As such, the BAT 46 can be used to counter or otherwise slow down the rotation of the engine drive shaft 44.

The driving of the engine drive shaft 44 through the ATS 10 can be used during one or both of startup or restart of the turbine engine 14. During startup, air can be fed to the ATS 10 through the bleed air circuit 30 or from an exterior source (e.g., a ground cart) to drive the engine drive shaft 44 to start the drawing in of air through the fan section 16 to begin the process of compressing and combusting the working airflow. During restart (e.g., when the turbine engine 14 has previously started but has ceased to continue running), the engine drive shaft 44 can begin winding down such that the engine drive shaft 44 decreases in rotational velocity but still draws in air to define the working airflow and bleed air. The circuit bleed air can be fed to the ATS 10 through the bleed air circuit 30. The ATS 10 can then increase the rotational speed of the engine drive shaft 44 such that the turbine engine 14 can continue to draw in the working airflow and subsequently attempt to restart the turbine engine 14 by combusting the compressed airflow.

It is contemplated that the engine drive shaft 44 can include a first demand of a transfer of energy from the ATS 10 in order to startup or restart the turbine engine 14. It is contemplated that the engine drive shaft can have a second demand of a transfer of energy from the BAT 46 during normal operation of the turbine engine 14. The second demand is smaller than the first demand as the BAT 46 is used when the engine drive shaft 44 is already rotating due to the operation of the turbine engine 14, while the ATS 10 is used when the engine drive shaft 44 is winding down or otherwise not moving. As such, the ATS 10 requires the use of the ATS gearbox 112 to ensure that the output of the ATS 10 through the ATS output shaft 50 is at a sufficient level to meet the first demand. As the second demand is smaller than the first demand, the BAT 46 does not require the use of a respective gearbox to ensure that that the output of the BAT 46 through the BAT output shaft 48 is at a sufficient level to the meet the second demand. Further, as the ATS 10 includes the ATS gearbox 112, it can be required to decouple the ATS 10 from the AGB 12 or otherwise ensure that bleed air is not fed to the ATS 10 during normal operation of the turbine engine 14 to ensure that the second demand is not exceeded. As such, it has been found to be advantageous to include a separate turbine (e.g., the BAT 46) that can be used during normal operation of the turbine engine 14 to ensure that the second demand is not exceeded.

The circuit bleed air that is fed to the BAT 46 can subsequently be expanded as it flows through the BAT turbine of the BAT 46. This expansion of the circuit bleed air causes the circuit bleed air to be lowered in pressure and temperature. The third bleed air passage 64 defines a fluid outlet of the BAT 46. As such, the circuit bleed air being fed to the BAT 46 (through the second bleed air passage 62) has a pressure and temperature that is higher than the pressure and temperature of the circuit bleed air being fed from the BAT 46 (through the third bleed air passage 64).

The circuit bleed air within the third bleed air passage 64 can subsequently be selectively fed to the PCE 78 to at least partially define the bleed air inlet line 68 to the PCE 78. At least a portion of the circuit bleed air can bypass the BAT 46 by being fed to the PCE 78 through the bypass passage 66. The amount of circuit bleed air fed through the bypass passage 66 can be dependent on at least one of a volumetric flow rate of the circuit bleed air in the first bleed air passage 60 or a required pressure of the circuit bleed air being fed to the PCE 78 or external system 86. As a non-limiting example, if the circuit bleed air within the third bleed air passage 64 is lower than a required pressure of the circuit bleed air that is fed to the external system 86, the bypass passage 66 can supply a circuit bleed air from the first bleed air passage (higher pressure and temperature than the circuit bleed air in the third bleed air passage 64) and mix, at the junction 88, with the circuit bleed air from the third bleed air passage 64. This, in turn, raises the temperature and pressure of the circuit bleed air being fed to the PCE 78 or external system 86 with respect to the circuit bleed air in the third bleed air passage 64.

As the circuit bleed air is cooled by flowing through the BAT 46, the cooling of the circuit bleed air done by the PCE 78 can be reduced or eliminated. In other words, the PCE 78 does not need to cool the circuit bleed air as much in comparison with a scenario where the circuit bleed air is not first cooled by flowing through the BAT 46. This pre-cooling of the circuit bleed air prior to it being fed to the PCE 78 in turn reduces the needed size of the PCE 78 and the needed amount of cooling fluid being fed to the PCE 78 through the cooling fluid input 80. The amount of that the circuit bleed air that is fed through the BAT 46 and cooled can be large enough such that the circuit bleed air in the third bleed air passage 64 is at a sufficiently lower temperature that it does not need to be further cooled by the PCE 78 prior to being fed to the external system 86. This, in turn, means that the PCE 78 can be eliminated or otherwise bypassed altogether. The quantity of the cooling fluid fed to the PCE 78 can be reduced, this means that less air needs to be bled from the turbine engine 14 or otherwise sourced from other locations of the turbine engine 14 (e.g., through a RAM air configuration) to form the cooling fluid. This, in turn, means that more air is available to be compressed and combusted, thus increasing the rotational speed and torque of the engine drive shaft 44. The circuit bleed air in the bleed air circuit 30 can ultimately be fed to the external system 86 where it is used to operate the external system 86.

The operation of the BAT 46 and the ATS 10 can be done automatically through use of the controller 106. As a non-limiting example, the controller 106 can operate the BAT 46 by supplying circuit bleed air to the BAT 46 in order to augment the power of the engine drive shaft 44 based on a measured torque or speed of the engine drive shaft 44 alongside a required output of the turbine engine 14. As a non-limiting example, the controller 106 can include in the memory 110 or otherwise within a memory accessible to the controller 106 a function that anticipates the use of the BAT 46 to augment the power of the engine drive shaft 44 during normal operation of the turbine engine 14. In other words, the turbine engine 14 can be operated in such a fashion that it is anticipated that the BAT 46 will be used during normal operation of the turbine engine 14. As such, the BAT 46 can be used to augment the power of the engine drive shaft 44 even if the turbine engine 14 is able to produce the needed output without the use of BAT 46. This, in tun, allows for more efficient operation of the turbine engine 14 as the turbine engine 14 can extract additional work from the bleed air to augment the power of the engine drive shaft 44, thus lowering a required amount of gaseous fuel needed to produce the needed combustion gases to drive the engine drive shaft 44.

Benefits associated with the present disclosure include a turbine engine with increased efficiency when compared to a conventional turbine engine. For example, traditional turbine engines can include a bleed air circuit that feeds bleed air to an external system. Work, however, is not extracted from this bleed air in order to drive the engine drive shaft. The turbine engine as descried herein, however, includes the bleed air circuit with the BAT that extracts work from the bleed air prior to it being fed to the external system. This extracted work, in turn, is used to augment the driving of the engine drive shaft. In other words, work is extracted from the bleed air which, in turn, increases the turbine engine efficiency when compared to the conventional turbine engine.

Additional benefits of the present disclosure include a decreased footprint or elimination of the PCE. For example, conventional turbine engines that include a bleed air circuit used to feed bleed air to the external system require the PCE to cool the bleed air to the required temperature of the external system. The bleed air circuit as described herein, however, can pre-cool the bleed air through the BAT. The pre-cooling of the bleed air can, in turn, reduce the size of or otherwise fully eliminate the need of the PCE when compared to the conventional bleed air circuit.

Additional benefits of the present disclosure include a bleed air circuit that is able to both augment the driving of the engine drive shaft, and at least one of start or restart the turbine engine. The bleed air circuit, as described herein, includes both the BAT and the ATS such that bleed air from the turbine engine can be used to augment the driving of the engine drive shaft or restart the turbine engine while still supplying bleed air to the auxiliary systems or external systems.

Additional benefits of the present disclosure include an increased amount of bleed air that is drawn from the turbine engine when compared to the conventional turbine engine. For example, in the conventional turbine engine the extracted bleed air is not used to augment the power of the engine drive shaft. If too much bleed air is drawn from the turbine engine, not enough combustion gases will be generated or the combustion gases will not be at a needed pressure. This, in turn, can cause the conventional turbine engine to stall. The turbine engine as described herein, however, uses the bleed air to augment the power of the engine drive shaft (e.g., through the BAT), which in turn means that more bleed air can be drawn from the turbine engine without fear of stalling the turbine engine. As more bleed air can be drawn from the turbine engine with respect to the conventional turbine engine, more bleed air can be fed to auxiliary systems or external systems, thus increasing the efficiency of the systems that the bleed air is fed to.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine, comprising an engine core comprising a fan section, a compressor section, a combustion section, and a turbine section in serial flow arrangement, an engine drive shaft operably coupling the fan section, the compressor section and the turbine section, an accessory gear box (AGB) operably coupled to the engine drive shaft, an air turbine starter (ATS) having an ATS turbine, an ATS gearbox, an ATS drive shaft operably coupling the ATS turbine and the ATS gearbox, and an ATS output shaft operably coupling the ATS gearbox to the AGB, a bleed air turbo (BAT) including a BAT turbine, and a BAT output shaft, the BAT output shaft being operably coupled to the AGB, and a bleed air circuit comprising a first bleed air passage fluidly coupled to the compressor section, a second bleed air passage fluidly coupling the first bleed air passage to an input of the BAT, a third bleed air passage fluidly coupled to an output of the BAT, and a bypass passage fluidly coupled to the third bleed air passage while bypassing the BAT.

An assembly for a turbine engine, the assembly comprising an accessory gear box (AGB), an air turbine starter (ATS) having an ATS turbine, an ATS gearbox, an ATS drive shaft operably coupling the ATS turbine and the ATS gearbox, and an ATS output shaft operably coupling the ATS gearbox to the AGB, a bleed air turbo (BAT) including a BAT turbine, and a BAT output shaft, the BAT output shaft being operably coupled to the AGB, and a bleed air circuit comprising a first bleed air passage, a second bleed air passage fluidly coupling the first bleed air passage to an input of the BAT, a third bleed air passage fluidly coupled to an output of the BAT, and a bypass passage fluidly coupled to the third bleed air passage while bypassing the BAT.

The turbine engine of any preceding clause, wherein the driving of the BAT, through a working fluid supplied to the BAT through the second bleed air passage, drives the AGB via the BAT output shaft.

The turbine engine of any preceding clause, wherein the driving of the AGB through the BAT output shaft is conducted during operation of the turbine engine.

The turbine engine of any preceding clause, wherein the BAT turbine is directly coupled to the AGB through the BAT output shaft.

The turbine engine of any preceding clause, further comprising a pre-cooler heat exchanger (PCE) fluidly coupled to the fan section and a system external to the turbine engine.

The turbine engine of any preceding clause, wherein the third bleed air passage fluidly couples the BAT to the PCE, and the bypass passage fluidly couples the first bleed air passage to the PCE.

The turbine engine of any preceding clause, wherein the third bleed air passage and the bypass passage meet at a junction upstream of the PCE.

The turbine engine of any preceding clause, wherein the PCE is selectively fluidly coupled to at least one of the third bleed air passage or the bypass passage to define a fluid input to the PCE, and fluidly coupled to the system external the turbine engine to define a fluid output of the PCE.

The turbine engine of any preceding clause, wherein the PCE includes a cooling fluid input and a cooling fluid output, with the cooling fluid input being fluidly coupled to at least one of the fan section or the compressor section.

The turbine engine of any preceding clause, wherein the system external the turbine engine includes an environmental control system.

The turbine engine of any preceding clause, wherein the second bleed air passage and the third bleed air passage each include a respective working fluid with a respective temperature and respective pressure, and the temperature and pressure of the working fluid in the second bleed air passage is less than the temperature and the pressure of the working fluid in the third bleed air passage.

The turbine engine of any preceding clause, wherein the ATS is configured to restart, during a wind down of the turbine engine and through driving of the ATS output shaft, the turbine engine.

The turbine engine of any preceding clause, wherein the bleed air circuit comprises a fourth bleed air passage fluidly coupling at least one of the third bleed air passage or the bypass passage to the ATS, and a working fluid within the fourth bleed air passage is supplied to the ATS during restart of the turbine engine.

The turbine engine of any preceding clause, wherein the bleed air circuit comprises a low pressure (LP) bleed air passage, and a high pressure (HP) bleed air passage, with the LP bleed air passage being fluidly coupled to a portion of the turbine engine upstream of the HP bleed air passage.

The turbine engine of any preceding clause, wherein the LP bleed air passage and the HP bleed air passage are each, independently, selectively fluidly coupled to the first bleed air passage.

The turbine engine of any preceding clause, wherein the compressor section includes a high pressure (HP) compressor and a low pressure (LP) compressor, the LP bleed air passage is fluidly coupled to the LP compressor and the HP bleed air passage is fluidly coupled to the HP compressor.

The turbine engine of any preceding clause, further comprising a controller configured to automatically selectively supply a working fluid within the second bleed air passage to at least one of the BAT or the bypass passage based on at least one of a rotational speed or torque of the engine drive shaft or a requirement of the system external the turbine engine.

The turbine engine of any preceding clause, wherein the bleed air circuit further comprises an auxiliary system bleed air passage fluidly coupling the first bleed air passage to an auxiliary system.

The turbine engine of any preceding clause, further comprising an engine casing housing the engine core, with the BAT and the ATS being provided exterior the engine casing.

The turbine engine of any preceding clause, wherein a driving of the ATS and the BAT both drive the engine drive shaft through the AGB.

The turbine engine of any preceding clause, further comprising a first valve provided along the LP bleed air passage and selectively fluidly coupling a bleed air from the turbine engine to the LP bleed air passage.

The turbine engine of any preceding clause, further comprising a second valve provided along the HP bleed air passage and selectively fluidly coupling a bleed air from the turbine engine to the HP bleed air passage.

The turbine engine of any preceding clause, further comprising a third valve provided along the first bleed air passage, the third valve selectively fluidly coupling a circuit bleed air from the first bleed air passage to the BAT.

The turbine engine of any preceding clause, wherein the third valve is provided at a junction between the first bleed air passage.

The turbine engine of any preceding clause, wherein the third valve selectively fluidly couples a bleed air from the turbine engine to at least one of the bypass passage or the second bleed air passage.

The turbine engine of any preceding clause, further comprising a fourth valve provided along the second bleed air passage.

The turbine engine of any preceding clause, wherein the fourth valve selectively fluidly couples a circuit bleed air from the first bleed air passage to the BAT.

The turbine engine of any preceding clause, further comprising a sixth valve selectively fluidly coupling at least one of the third bleed air passage or the bypass passage to the PCE or the external system.

The turbine engine of any preceding clause, wherein the sixth valve is provided downstream the junction between the bypass passage and the third bleed air passage.

The turbine engine of any preceding clause, wherein the sixth valve defines the junction between the bypass passage and the third bleed air passage.

The turbine engine of any preceding clause, further comprising a seventh valve provided along the fourth bleed air passage.

The turbine engine of any preceding clause, wherein the fourth valve selectively fluidly couples a circuit bleed air from at least one of the bypass passage or the third bleed air passage to the ATS.

A method of operating the turbine engine of any preceding clause, the method comprising supplying a bleed air from the turbine engine to the BAT.

The method of any preceding clause, further comprising driving, through the bleed air supplied to the BAT, the BAT output shaft.

The method of any preceding clause, further comprising driving, at least partially through the BAT output shaft, the engine drive shaft.

The method of any preceding clause, further comprising driving, at least partially through the BAT output shaft, the engine drive shaft during an operation of the turbine engine.

The method of any preceding clause, further comprising supplying a bleed air from a first location and a second location, different from the first location, from the turbine engine and to the BAT.

The method of any preceding clause, further comprising supplying a bleed air from a first location, a second location, different from the first location, and a third location, different from the second location and the third location, from the turbine engine and to the BAT.

What is claimed is:

1. An assembly for a turbine engine, the turbine engine having an engine core comprising a fan section, a compressor section, a combustion section, a turbine section, and an engine drive shaft operably coupling the fan section, the compressor section and the turbine section, the assembly comprising:
   an accessory gear box (AGB);
   an air turbine starter (ATS) having an ATS turbine, an ATS gearbox, an ATS drive shaft operably coupling the ATS turbine and the ATS gearbox, and an ATS output shaft operably coupling the ATS gearbox to the AGB;
   a bleed air turbo (BAT) including a BAT turbine, and a BAT output shaft, the BAT output shaft being operably coupled to the AGB; and
   a bleed air circuit comprising:
     a first bleed air passage;
     a second bleed air passage fluidly coupling the first bleed air passage to an input of the BAT; and
     a third bleed air passage fluidly coupled to an output of the BAT;
   wherein the BAT output shaft is driven by supplying a working fluid to the BAT through the second bleed air passage, the driving of the BAT output shaft supplying a mechanical input to and at least partially driving the AGB.

2. The assembly of claim 1, wherein the driving of the AGB through the BAT output shaft is conducted during operation of the turbine engine.

3. The assembly of claim 1, wherein the BAT turbine is directly coupled to the AGB through the BAT output shaft.

4. The assembly of claim 1, further comprising a pre-cooler heat exchanger (PCE) fluidly coupled to the fan section and a system external to the turbine engine.

5. The assembly engine of claim 4, wherein:
   the bleed air circuit further comprises a bypass passage fluidly coupling the first bleed air passage to the third bleed air passage while by passing the BAT; and
   the third bleed air passage fluidly couples the BAT to the PCE, and the bypass passage fluidly couples the first bleed air passage to the PCE.

6. The assembly of claim 4, wherein:
   the bleed air circuit further comprises a bypass passage fluidly coupling the first bleed air passage to the third bleed air passage while bypassing the BAT; and
   the third bleed air passage and the bypass passage meet at a junction upstream of the PCE.

7. The assembly of claim 4, wherein:
   the bleed air circuit further comprises a bypass passage fluidly coupling the first bleed air passage to the third bleed air passage while bypassing the BAT; and
   the PCE is selectively fluidly coupled to at least one of the third bleed air passage or the bypass passage to define a fluid input to the PCE, and fluidly coupled to the system external the turbine engine to define a fluid output of the PCE.

8. The assembly of claim 7, wherein the PCE includes a cooling fluid input and a cooling fluid output, with the cooling fluid input being fluidly coupled to at least one of the fan section or the compressor section.

9. The assembly of claim 4, wherein the system external the turbine engine includes an environmental control system.

10. The assembly of claim 1, wherein:
    the second bleed air passage and the third bleed air passage each include a respective working fluid with a respective temperature and respective pressure; and
    the temperature and the pressure of the working fluid in the second bleed air passage is greater than the temperature and the pressure of the working fluid in the third bleed air passage.

11. The assembly of claim 1, wherein the bleed air circuit comprises a low pressure (LP) bleed air passage, and a high pressure (HP) bleed air passage, with the LP bleed air passage being fluidly coupled to a portion of the turbine engine upstream of the HP bleed air passage.

12. The assembly of claim 11, wherein the LP bleed air passage and the HP bleed air passage are each, independently, selectively fluidly coupled to the first bleed air passage.

13. The assembly of claim 12, wherein the compressor section includes a high pressure (HP) compressor and a low pressure (LP) compressor, the LP bleed air passage is fluidly coupled to the LP compressor and the HP bleed air passage is fluidly coupled to the HP compressor.

14. The assembly of claim 1, wherein the bleed air circuit further comprises an auxiliary system bleed air passage fluidly coupling the first bleed air passage to an auxiliary system.

15. The assembly of claim 1, wherein a driving of the ATS and a driving of the BAT cause the engine drive shaft to be driven through the AGB.

16. The assembly of claim 1, wherein the bleed air circuit further comprises a bypass passage fluidly coupling the first bleed air passage to the third bleed air passage while bypassing the BAT.

17. An assembly for a turbine engine, the turbine engine having an engine core comprising a fan section, a compressor section, a combustion section, a turbine section, and an engine drive shaft operably coupling the fan section, the compressor section and the turbine section, the assembly comprising:
    an accessory gear box (AGB);
    an air turbine starter (ATS) having an ATS turbine, an ATS gearbox, an ATS drive shaft operably coupling the ATS turbine and the ATS gearbox, and an ATS output shaft operably coupling the ATS gearbox to the AGB;

a bleed air turbo (BAT) including a BAT turbine, and a BAT output shaft, the BAT output shaft being operably coupled to the AGB; and a bleed air circuit comprising:
  a first bleed air passage;
  a second bleed air passage fluidly coupling the first bleed air passage to an input of the BAT;
  a third bleed air passage fluidly coupled to an output of the BAT; and a bypass passage fluidly coupling the first bleed air passage to the third bleed air passage while bypassing the BAT; and a controller configured to automatically selectively supply a working fluid within the second bleed air passage to at least one of the BAT or the bypass passage, the supplying of the working fluid being based on at least one of a rotational speed or torque of the engine drive shaft or a requirement of a system external the turbine engine.

18. An assembly for a turbine engine, the turbine engine having an engine core comprising a fan section, a compressor section, a combustion section, a turbine section, and an engine drive shaft operably coupling the fan section, the compressor section and the turbine section, the assembly comprising:

an accessory gear box (AGB);

an air turbine starter (ATS) having an ATS turbine, an ATS gearbox, an ATS drive shaft operably coupling the ATS turbine and the ATS gearbox, and an ATS output shaft operably coupling the ATS gearbox to the AGB;

a bleed air turbo (BAT) including a BAT turbine, and a BAT output shaft, the BAT output shaft being operably coupled to the AGB; and a bleed air circuit comprising:
  a first bleed air passage;
  a second bleed air passage fluidly coupling the first bleed air passage to an input of the BAT;
  a third bleed air passage fluidly coupled to an output of the BAT; a bypass passage fluidly coupling the first bleed air passage to the third bleed air passage while bypassing the BAT; and
  a fourth bleed air passage fluidly coupling at least one of the third bleed air passage or the bypass passage to the ATS.

19. The assembly of claim 18, wherein the ATS is configured to restart, during a wind down of the turbine engine and through driving of the ATS output shaft, the turbine engine.

20. The assembly of claim 19, wherein: a working fluid within the fourth bleed air passage is supplied to the ATS during restart of the turbine engine.

\* \* \* \* \*